US 6,467,964 B2

(12) United States Patent
Smith et al.

(10) Patent No.: US 6,467,964 B2
(45) Date of Patent: Oct. 22, 2002

(54) SELF CLEANING BEARING ASSEMBLY FOR USE IN A DEHYDRATOR OR WASHER FOR PARTICULATE SOLIDS

(75) Inventors: Brian L. Smith, Windsor, CT (US); Arnold Serenkin, Simsbury, CT (US)

(73) Assignee: National Conveyors Company, Inc., East Granby, CT (US)

( * ) Notice: Subject to any disclaimer, the term of this patent is extended or adjusted under 35 U.S.C. 154(b) by 26 days.

(21) Appl. No.: 09/782,165

(22) Filed: Feb. 13, 2001

(65) Prior Publication Data

US 2002/0110296 A1 Aug. 15, 2002

(51) Int. Cl.[7] .............................................. F16C 33/74
(52) U.S. Cl. ...................... 384/130; 384/150; 384/624; 198/672; 210/523
(58) Field of Search ................................ 384/276, 489, 384/624, 150, 280, 281, 132, 130; 198/672; 210/523, 803, 161, 396

(56) References Cited

U.S. PATENT DOCUMENTS

| 961,958 A | | 6/1910 | Hartley ........................ 198/660 |
|---|---|---|---|
| 1,177,792 A | | 4/1916 | Mims .......................... 198/660 |
| 3,428,219 A | | 2/1969 | Solum ......................... 222/134 |
| 3,702,128 A | * | 11/1972 | Trotter, Jr. .................. 198/582 |
| 3,760,714 A | * | 9/1973 | Lortz .......................... 99/404 |
| 3,901,483 A | * | 8/1975 | Lasar .......................... 366/193 |
| 4,244,720 A | * | 1/1981 | Boen et al. .................... 65/8 |
| 4,379,049 A | * | 4/1983 | Bassett ........................ 209/464 |
| 4,448,678 A | * | 5/1984 | Gentry ......................... 209/3 |
| 4,842,423 A | * | 6/1989 | Bhagwat ....................... 384/130 |
| 4,862,601 A | * | 9/1989 | Baillie ........................ 34/182 |
| 5,160,441 A | * | 11/1992 | Lundquist ..................... 210/781 |
| 5,636,580 A | | 6/1997 | Kanis .......................... 110/257 |
| 5,714,043 A | | 2/1998 | Finley et al. .................. 202/262 |
| 6,161,559 A | * | 12/2000 | Brenner ........................ 134/65 |

OTHER PUBLICATIONS

Eagle Iron Works, "Fine and Coarse Material Washers, General Catalog Section 'C'," 1982.
McLanahan Corporation, "Single and Double Screw Washers for Fine and Coarse Materials," 1986.

* cited by examiner

Primary Examiner—Matthew C. Graham
Assistant Examiner—Mariano Sy
(74) Attorney, Agent, or Firm—Fish & Neave; Jeffrey H. Ingerman

(57) ABSTRACT

A self cleaning bearing assembly for use in a dehydrator washer for particulate solids which comprises a feed reservoir for water and particulate solids and an inclined main screw conveyor having a projecting shaft lower end portion submerged in the reservoir. The bearing assembly comprises a housing having an end cap at one end and an opening at the opposite end in communication with the interior of the feed reservoir. The housing has its longitudinal center line coincident with the main screw conveyor and a stub shaft mounted on the end cap of the bearing assembly also has its axis coincident with that of the main crew conveyor and its shaft. The projecting lower end portion of the main conveyor shaft and the stub shaft are disposed with the stub shaft in radially spaced relationship within the main shaft and a sleeve bearing is disposed in the radial space between the stub shaft and the main shaft. A short auxiliary screw conveyor section disposed on the projecting end portion of the main conveyor shaft acts to clear solids from the sleeve bearing in a sweeping action whereby to maintain the same in a clean condition for lubrication by the liquid from the reservoir.

30 Claims, 1 Drawing Sheet

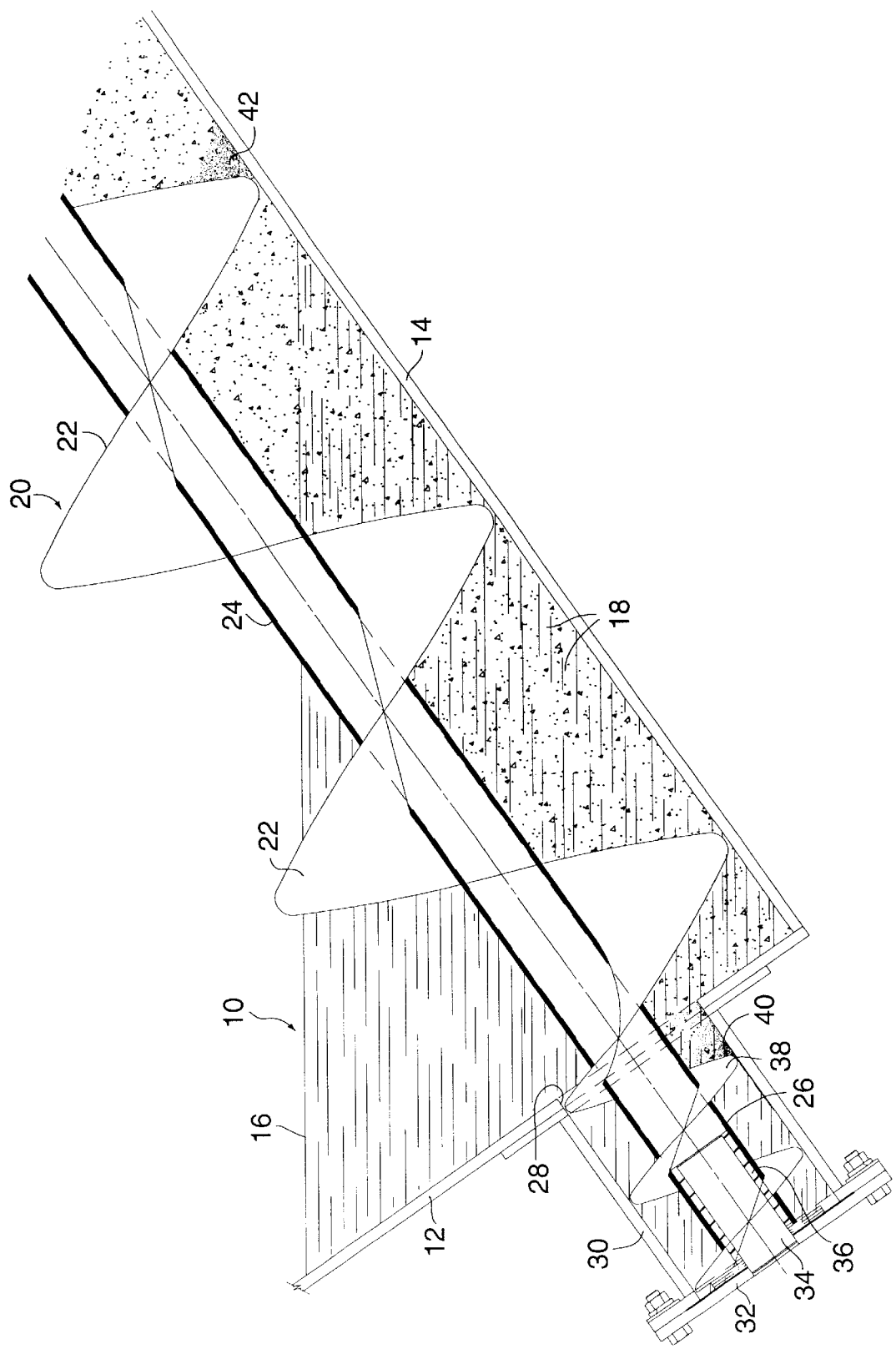

SELF CLEANING BEARING ASSEMBLY FOR USE IN A DEHYDRATOR OR WASHER FOR PARTICULATE SOLIDS

BACKGROUND OF THE INVENTION

Conventional apparatus for washing, dehydrating and/or classifying particulate solids comprises a reservoir or feed chamber which receives a slurry comprising water or other washing liquid and the particulate solids. The solids, for example, may be sand, crushed rock fines, industrial minerals, metallic ores, coal or metal chips etc. As will be apparent, the particulate solids settle downwardly in the liquid in the reservoir or feed chamber and are then conveyed upwardly along an inclined path by the rotating helicoid of a screw conveyor. During the upward travel of the solid particulate, the solids emerge above the surface of the liquid permitting liquid drainage by gravity from the solids during their continuing upward movement to a discharge outlet at the upper end of the screw conveyor.

The upper end of the screw conveyor may have its shaft supported by a conventional roller bearing and may be driven by conventional means such as an electric motor. The lower end of the conveyor shaft is submerged in the liquid and may be journalled in a sealed outboard roller bearing or a pressurized liquid flushed marine type bearing similar to those used with boat propeller shafts.

Due to turbulence within the liquid slurry, conventional submerged and sealed bearings require regular inspection and may frequently require replacement of seals which wear as a result of the gradual and unavoidable ingress of abrasive solids. Where pressurized water flushed bearings are used, any temporary curtailment of flushing water as from a drop in water pressure may result in the intrusion of abrasive solids into the bearing assembly, thereby accelerating wear and the need for replacement.

It is the general object of the present invention to provide a liquid lubricated bearing assembly for use in a washer, dehydrator, classifier or other apparatus, the need for elaborate sealing or the use of external flushing water or other liquid being eliminated, and yet highly efficient operation and long life of the bearing assembly being achieved.

SUMMARY OF THE INVENTION

In accordance with the present invention and in fulfillment of the foregoing object, a self cleaning bearing assembly is provided for use in a dehydrator, washer or the like for fine particulate solids having a feed reservoir into which liquid and particulate solids are received and an inclined screw conveyor with a lower end portion and a projecting shaft end portion submerged in the reservoir. Communication of the bearing housing with the interior of the washer reservoir preferably occurs at a location above the lowermost point of the reservoir. The bearing housing longitudinal centerline is coincident with the axis of the main screw conveyor and its shaft and a stub shaft mounted on the end cap of the bearing assembly housing also has its axis coincident with that of the screw conveyor and its shaft. The projecting lower end portion of the conveyor shaft and the stub shaft are disposed one within the other in radially spaced relationship and a conventional sleeve bearing is disposed in the radial space between the stub shaft and the projecting end portion of the main conveyor shaft. A short auxiliary helicoid conveyor section disposed in the bearing housing acts to efficiently sweep abrasive solids away from the sleeve bearing whereby to maintain the same in a clean condition for lubrication by the liquid in the reservoir.

In accordance with the presently preferred practice, the short auxiliary screw conveyor section is mounted on and rotatably driven by the projecting end portion of the main conveyor shaft. The pitch of the auxiliary conveyor section, however, is substantially less than that of the main conveyor to provide for relatively high frequency or high velocity upward sweeping movement of solids which may enter the bearing housing. Finally, the shaft of the main conveyor is preferably tubular with the stub shaft disposed therewithin and the short auxiliary screw conveyor section mounted on the exterior of the shaft.

In a general purpose embodiment of the bearing assembly, a shaft end portion is submerged in a liquid which may or may not have fine particulate solids also submerged in the liquid, but which may have other potential bearing contaminants requiring flushing of the bearing assembly. Accordingly, a short auxiliary screw conveyor section as described is provided for such purpose in the liquid and acts to sweep potential contaminants away from the bearing as aforesaid.

BRIEF DESCRIPTION OF THE DRAWINGS

The single FIGURE of the drawings is a schematic representation of a bearing assembly in accordance with the present invention in cross section and in combination with an inclined conveyor in a washer apparatus of the type described above.

DETAILED DESCRIPTION OF THE INVENTION

Referring to the drawing, a feed chamber or reservoir is indicated generally at 10 with an upwardly and leftwardly inclined end wall 12 and an upwardly and rightwardly inclined bottom 14. Front and rear side walls, not shown, cooperate with the left hand end wall and bottom to define the chamber or reservoir for the reception of a slurry therewithin containing a liquid such as water 16 with fine particulate solids such as sand 18 dispersed therein. A main conveyor indicated generally at 20 is inclined upwardly and rightwardly and has a series of flights 22 which are carried by a tubular shaft 24 in turn rotatably driven by an electric motor, not shown, at an upper end portion thereof. The shaft is of course journalled at its upper end portion normally by a bearing.

A projecting lower end portion of the conveyor shaft at 26 extends through the inclined left-hand wall 12 at an opening 28 therein. The opening 28 is disposed somewhat above the lowermost portion or bottom 14 of the reservoir and has associated therewith a bearing housing 30. The bearing housing 30 may be welded to the wall 12 as shown and is preferably cylindrical with an end cap 32 closing a left-hand end portion thereof. The right-hand end portion of the housing 30 is open and communicates with the reservoir 10. Thus, both water and fine particulate solids may enter the bearing housing 30 from the reservoir although the entry of the solids is to some degree minimized by the elevation of the opening 28 above the wall 12, the solids of course tending to settle to the bottom of the reservoir.

A stub shaft 34 forms an essential part of the bearing assembly and is preferably mounted on the end cap 32 as shown. While a reverse arrangement also falls within the contemplation of the invention, the stub shaft is solid and the conveyor shaft 24 is tubular so as to envelope the stub shaft in radially spaced relationship therewith. A conventional sleeve bearing 36 is disposed in the radial space between the stub shaft 34 and the interior wall of the tubular shaft 24 and is preferably in press fit engagement with one of said elements.

Further, in accordance with the present invention, a short auxiliary screw conveyor section is provided within the bearing housing 30 and operates to create an upward sweeping action within the housing to expel solid particulates which may enter therein and to maintain the sleeve bearing 36 contaminant free. That is, the short conveyor section 38 has a pitch substantially less than that of the main conveyor 20 and thus creates a relatively high velocity or high frequency sweeping of both solid particulates and water rightwardly and upwardly out of the bearing housing and into the reservoir 10. As illustrated at 40 fine particulate solids which may have entered the bearing housing are thus swept from the housing and an efficient and contaminant free liquid lubrication of the sleeve bearing 36 is achieved without the aid of an external supply of water or liquid.

The main conveyor 20 also collects and transports fine solid particulates as at 42 upwardly and rightwardly in a washing, dehydrating and/or classifying operation. The diameter of the main conveyor, as shown, is substantially larger than that of the short auxiliary conveyor section and the pitch of the former is also substantially greater than that of the short conveyor section.

In view of the foregoing, it will be apparent that a relatively simple and yet highly efficient bearing assembly has been provided for operation without the need for multiple sealing or an external supply of water or other flushing liquid. The bearing assembly also has wide general purpose use as mentioned above.

What is claimed is:

1. A self cleaning bearing assembly for use in a washer or dehydrator for particulate solids comprising (a) a reservoir for receiving a slurry of liquid and particulate solids, and (b) an inclined main screw conveyor having a diameter, a pitch, an axis, a rotatable main screw conveyor shaft along said axis, and a lower end portion with a projecting lower end portion of said main screw conveyor shaft submerged in the reservoir; the bearing assembly comprising:
    a housing having an end cap at one end and an opening at an opposite end in communication with the interior of the reservoir, the housing having a longitudinal center-line coincident with the axis of the main screw conveyor and the main screw conveyor shaft;
    a stub shaft mounted on the end cap of the bearing assembly and having its axis coincident with the axis of the main screw conveyor and the main screw conveyor shaft, the projecting lower end portion of the main screw conveyor shaft and the stub shaft being disposed one within the other in radially spaced relationship, leaving a radial space therebetween;
    a sleeve bearing disposed in the radial space between the stub shaft and the projecting lower end portion of the main screw conveyor shaft; and
    a short auxiliary screw conveyor section, having a diameter substantially smaller than that of the main screw conveyor, disposed in the bearing housing and acting to sweep solids upwardly and away from the sleeve bearing, whereby to maintain the sleeve bearing in a clean condition for lubrication by the liquid in the reservoir.

2. The self cleaning bearing assembly of claim 1, wherein the short auxiliary screw conveyor section is mounted on, and rotatably driven by, the projecting lower end portion of the main screw conveyor shaft.

3. The self cleaning bearing assembly of claim 1, wherein the short auxiliary screw conveyor section has a diameter and a pitch substantially less than the diameter and the pitch of the main screw conveyor.

4. The self cleaning bearing assembly of claim 1, wherein the bearing housing is cylindrical and has a diameter substantially less than the diameter of the main screw conveyor.

5. The self cleaning bearing assembly of claim 1, wherein:
    the main screw conveyor shaft is tubular;
    the stub shaft is solid; and
    the stub shaft is received within the projecting lower end portion of the main screw conveyor shaft in said radially spaced relationship.

6. The self cleaning bearing assembly of claim 5, wherein the sleeve bearing is disposed in the radial space between the stub shaft and the projecting lower end portion of the main screw conveyor shaft in press fit relationship with one of (a) said stub shaft, and (b) said projecting lower end portion of the main screw conveyor shaft.

7. The self cleaning bearing assembly of claim 6, wherein the short auxiliary conveyor section extends downwardly and rearwardly substantially throughout the length of the bearing housing to the end cap thereof.

8. A self cleaning bearing assembly for use with a projecting shaft end portion submerged in a liquid reservoir, said projecting shaft end portion having an axis and being rotatable about said axis; the bearing assembly comprising:
    a housing that is closed except at an opening in communication with the liquid reservoir, the housing having a longitudinal center-line coincident with the axis of the projecting shaft end portion, said projecting shaft end portion extending into said housing from said reservoir through said opening;
    a stub shaft mounted at an end of the housing opposite the opening and having an axis coincident with that of the projecting shaft end portion, the projecting shaft end portion and the stub shaft being disposed one within the other in radially spaced relationship, leaving a radial space therebetween;
    a sleeve bearing disposed in the radial space between the stub shaft and the projecting shaft end portion; and
    a short auxiliary screw conveyor section disposed in the housing and acting to sweep potential contaminants away from the sleeve bearing, whereby to maintain the sleeve bearing in a clean condition for liquid lubrication.

9. The self cleaning bearing assembly of claim 8 wherein the short auxiliary screw conveyor section is mounted on, and rotatably driven by, the projecting shaft end portion.

10. The self cleaning bearing assembly of claim 8 wherein:
    the projecting shaft end portion extends from a shaft of a main screw conveyor having a diameter and a pitch; and
    the short auxiliary screw conveyor section has a pitch that is substantially less than the pitch of the main screw conveyor.

11. The self cleaning bearing assembly of claim 10 wherein the housing and the short auxiliary screw conveyor section within the housing have a diameter that is substantially less than the diameter of the main screw conveyor.

12. The self cleaning bearing assembly of claim 8 wherein:
    the projecting shaft end portion is tubular;
    the stub shaft is solid; and
    the stub shaft is received within the projecting shaft end portion in said radial spaced relationship leaving a radial space therebetween.

13. The self cleaning bearing assembly of claim 12, wherein the sleeve bearing is disposed in the radial space between the stub shaft and the projecting shaft end portion in press fit relationship with one of (a) the stub shaft, and (b) the projecting lower end portion of the main screw conveyor shaft.

14. The self cleaning bearing assembly of claim 13, wherein the projecting shaft end portion extends downwardly and rearwardly substantially throughout the length of the housing to an end thereof opposite the opening, and carries the short auxiliary screw conveyor section.

15. A self cleaning bearing assembly for use with a rotatable shaft in a reservoir containing a liquid, said reservoir having a lower-most point and a wall, said bearing assembly comprising:

a housing attached to said wall outside said reservoir, said wall having an opening therein above said lower-most point and said housing communicating with said reservoir through said opening, a segment of said rotatable shaft extending into said housing through said opening, said housing being closed other than at said opening;

a bearing mounted in said housing for rotatably receiving a portion of said segment of said rotatable shaft; and a screw conveyor section mounted on said segment of said rotatable shaft and acting, upon rotation of said rotatable shaft, to sweep potential contaminants away from said bearing.

16. The self cleaning bearing assembly of claim 15 wherein said portion of said segment of said rotatable shaft is an end of said segment of said rotatable shaft.

17. The self cleaning bearing assembly of claim 16 wherein:

said rotatable shaft is tubular;

said housing has an end wall opposite said opening;

said end wall has a stub shaft extending therefrom toward said opening; and said end of said segment of said tubular rotatable shaft has said stub shaft received therewithin, whereby said rotatable shaft rotates on said stub shaft.

18. The self cleaning bearing assembly of claim 17 wherein:

said stub shaft is received in radially spaced relationship within said end of said segment of said tubular rotatable shaft, leaving a radial space therebetween; said assembly further comprising:

a sleeve bearing disposed in the radial space between said stub shaft and said end of said segment of said tubular rotatable shaft.

19. The self cleaning bearing assembly of claim 18 wherein said sleeve bearing is in press fit relationship with one of (a) said stub shaft, and (b) said end of said segment of said tubular rotatable shaft.

20. The self cleaning bearing assembly of claim 15 wherein:

said housing is cylindrical, having a housing diameter and a housing axis;

said segment of said rotatable shaft has a shaft axis coincident with said housing axis; and said screw conveyor section has a diameter substantially equal to said housing diameter.

21. The self cleaning bearing assembly of claim 20 wherein said opening has an opening diameter substantially equal to said housing diameter.

22. The self cleaning bearing assembly of claim 20 wherein said wall has dimensions substantially perpendicular to said shaft axis, all said dimensions being substantially larger than said housing diameter.

23. A self cleaning bearing assembly for use in a washer or dehydrator for particulate solids comprising (a) a reservoir for receiving a slurry of liquid and particulate solids, said reservoir having a lower-most point and a wall, and (b) an inclined main screw conveyor having a diameter, a pitch, an axis, a rotatable main screw conveyor shaft along said axis, and a lower end portion with a projecting lower end portion of said main screw conveyor shaft submerged in the reservoir; the bearing assembly comprising:

a housing attached to said wall outside said reservoir, said wall having an opening therein above said lower-most point and said housing communicating with said reservoir through said opening, a segment of said projecting lower end portion of said main screw conveyor shaft extending into said housing through said opening, said housing being closed other than at said opening;

a bearing mounted in said housing for rotatably receiving a portion of said segment of said projecting lower end portion of said main screw conveyor shaft; and an auxiliary screw conveyor section mounted on said segment of said projecting lower end portion of said main screw conveyor shaft and acting, upon rotation of said main screw conveyor shaft, to sweep potential contaminants away from said bearing.

24. The self cleaning bearing assembly of claim 23 wherein said portion of said segment of said projecting lower end portion of said main conveyor shaft is an end of said projecting lower end portion of said main conveyor shaft.

25. The self cleaning bearing assembly of claim 24 wherein:

said projecting lower end portion of said main screw conveyor shaft is tubular;

said housing has an end wall opposite said opening;

said end wall has a stub shaft extending therefrom toward said opening; and said end of said segment of said tubular projecting lower end portion of said main screw conveyor shaft has said stub shaft received therewithin, whereby said main screw conveyor shaft rotates on said stub shaft.

26. The self cleaning bearing assembly of claim 25 wherein:

said stub shaft is received in radially spaced relationship within said end of said segment of said tubular projecting lower end portion of said main screw conveyor shaft, leaving a radial space therebetween; said assembly further comprising:

a sleeve bearing disposed in the radial space between said stub shaft and said end of said segment of said tubular projecting lower end portion of said main screw conveyor shaft.

27. The self cleaning bearing assembly of claim 26 wherein said sleeve bearing is in press fit relationship with one of (a) said stub shaft, and (b) said end of said segment of said tubular projecting lower end portion of said main screw conveyor shaft.

28. The self cleaning bearing assembly of claim 23 wherein:

said housing is cylindrical, having a housing diameter and a housing axis;

said segment of said projecting lower end portion of said main screw conveyor shaft has a shaft axis coincident with said housing axis; and said auxiliary screw conveyor section has a diameter substantially equal to said housing diameter.

29. The self cleaning bearing assembly of claim 28 wherein said opening has an opening diameter substantially equal to said housing diameter.

30. The self cleaning bearing assembly of claim 28 wherein said wall has dimensions substantially perpendicular to said shaft axis, all said dimensions being substantially larger than said housing diameter.

* * * * *